(12) United States Patent
Tanaka

(10) Patent No.: US 7,455,229 B2
(45) Date of Patent: Nov. 25, 2008

(54) DIRECT PRINT SYSTEM

(75) Inventor: Hiroshi Tanaka, Asaka (JP)

(73) Assignee: Fujifilm Corporation, Tokyo (JP)

( * ) Notice: Subject to any disclaimer, the term of this patent is extended or adjusted under 35 U.S.C. 154(b) by 298 days.

(21) Appl. No.: 11/144,700

(22) Filed: Jun. 6, 2005

(65) Prior Publication Data
US 2005/0279833 A1 Dec. 22, 2005

(30) Foreign Application Priority Data
Jun. 16, 2004 (JP) ............... 2004-177684

(51) Int. Cl.
*G06K 7/10* (2006.01)
*H04K 1/00* (2006.01)
(52) U.S. Cl. ................. 235/462.01; 380/270
(58) Field of Classification Search ........... 235/462.01, 235/462.05, 462.46, 383; 355/40; 380/270
See application file for complete search history.

(56) References Cited

U.S. PATENT DOCUMENTS

| | | | | |
|---|---|---|---|---|
| 4,440,248 | A * | 4/1984 | Teraoka | 235/462.01 |
| 5,448,046 | A * | 9/1995 | Swartz | 235/383 |
| 5,606,507 | A * | 2/1997 | Kara | 705/408 |
| 5,805,807 | A * | 9/1998 | Hanson et al. | 235/462.01 |
| 6,189,789 | B1 * | 2/2001 | Levine et al. | 235/383 |
| 6,685,093 | B2 * | 2/2004 | Challa et al. | 235/462.46 |
| 6,701,304 | B2 * | 3/2004 | Leon | 705/401 |
| 7,070,110 | B2 * | 7/2006 | Lapstun et al. | 235/462.45 |
| 2001/0035459 | A1 * | 11/2001 | Komai | 235/462.25 |
| 2003/0059051 | A1 * | 3/2003 | Hatano et al. | 380/270 |
| 2004/0021781 | A1 | 2/2004 | Iida | |
| 2005/0138205 | A1 * | 6/2005 | Naismith | 235/462.01 |
| 2005/0151943 | A1 * | 7/2005 | Iida | 355/40 |

FOREIGN PATENT DOCUMENTS

| | | |
|---|---|---|
| JP | 10-257119 A | 9/1998 |
| JP | 11-46331 A | 2/1999 |
| JP | 11-88815 A | 3/1999 |
| JP | 2002-111947 A | 4/2002 |
| JP | 2003-165253 A | 6/2003 |

* cited by examiner

*Primary Examiner*—Thien M. Le
*Assistant Examiner*—Thien T Mai
(74) *Attorney, Agent, or Firm*—Birch, Stewart, Kolasch & Birch, LLP

(57) ABSTRACT

Wireless-LAN information is set in a digital still camera in a comparatively simple manner. Specifically, if a digital still camera and a printer are to communicate utilizing a wireless LAN, the printer generates a two-dimensional bar code containing wireless-LAN setting information such as ESS-ID and WEP KEY, and printer setting information such as an IP address. The printer is used to generate a direct print setting sheet on which have been recorded the generated two-dimensional bar code as well as the wireless-LAN setting information and printer setting information. The digital still camera is used to take a picture of the two-dimensional bar code and read the wireless-LAN setting information and printer setting information from the two-dimensional bar code. The read wireless-LAN setting information and printer setting information is set in the digital still camera, and the printer and digital still camera cooperate to perform direct printing using the wireless LAN.

7 Claims, 13 Drawing Sheets

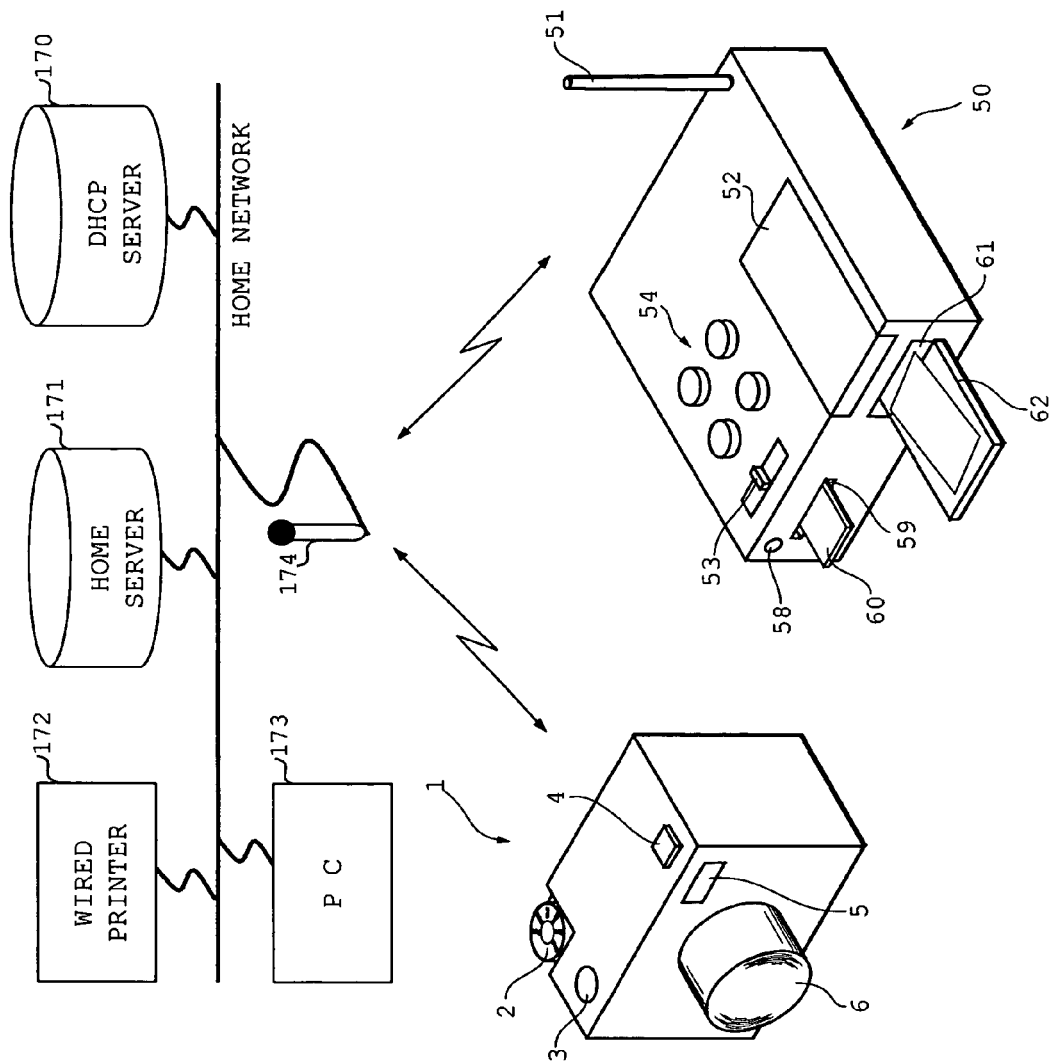

```
        Ultra Printer 100
   DIRECT PRINT SETTING SHEET

WIRELESS-LAN SETTING
            INFORMATION
  ESSID=ABCDEFG
  WEP KEY=1234567890123
  WIRELESS LAN MODE=
          INFRASTRUCTURE MODE

PRINTER SETTING INFORMATION
  IP ADDRESS=xxx.xxx.xxx.xxx
  USER NAME=yyyyyy
  PASSWORD= "zzzzz"

TAKE PICTURE OF FOLLOWING
     BAR CODE TO SET DIGITAL
              STILL CAMERA
```

DIRECT PRINT SYSTEM

BACKGROUND OF THE INVENTION

1. Field of the Invention

This invention relates to a direct print system, a printer and a digital camera (inclusive of a portable information device having the function of a digital still camera, an example of which is a mobile telephone equipped with a camera) that construct this system, and methods of controlling the printer and digital camera.

2. Description of the Related Art

When an image is printed, a printer is connected to a personal computer and image data is transmitted from the personal computer to the printer. The image represented by the image data is printed by the printer. The general practice is to connect the personal computer and the printer when an image is to be printed. If an image that has been captured by a digital camera is printed, image data representing the image is stored once in the personal computer.

In recent years, however, it has become possible to connect a digital still camera and a printer directly as by a cable without using a personal computer and to transmit image data from the digital still camera to the printer, thereby enabling the image captured by the digital still camera to be printed by the printer. Such a system is referred to as a so-called "direct print system". There are also available direct print systems that not only transmit image data by wired communication between a digital still camera and a personal computer through use of a cable but that also transmit image data by wireless communication (see the specifications of Japanese Patent Application Laid-Open Nos. 10-257119, 2003-165253, 11-88815, 11-46331 and 2002-111947).

However, encrypted communication cannot be performed unless information such as WEP-KEY is set in order to construct a direct print system utilizing wireless communication. Further, in a case where printers are connected on a network and a large number of devices have been connected on this network, image data cannot be transmitted to a specific printer unless the destination of the transmission is specified.

DISCLOSURE OF THE INVENTION

Accordingly, an object of the present invention is to enable printing to be performed comparatively simply utilizing wireless-LAN information in a case where use is made of a direct print system.

According to a first aspect of the present invention, the foregoing object is attained by providing a direct print system that includes a digital camera and a printer that are capable of communicating with each other utilizing a wireless LAN.

The printer in this system includes a wireless-LAN information acquisition device for acquiring wireless-LAN information, which includes setting information and transmission-destination information, used in transmission utilizing a wireless LAN; a bar code generating device for generating a bar code representing the wireless-LAN information that has been acquired by the wireless-LAN information acquisition device; and an output device for outputting the bar code that has been generated by the bar code generating device.

The digital camera in this system includes an image sensing device for sensing the image of the bar code that has been output by the output device of the printer and outputting data representing the bar code; a wireless-LAN information reading device for reading wireless-LAN information from the bar code data that has been output from the image sensing device; and a wireless LAN transmitting device for transmitting image data, which has been recorded on a recording medium, to the printer using the setting information and transmission-destination information included in the wireless-LAN information read by the wireless-LAN information reading device.

According to the present invention, wireless-LAN information (which contains setting information and transmission-destination information) used in transmission utilizing a wireless LAN is acquired in the printer. When this occurs, a bar code representing the acquired wireless-LAN information is generated and the generated bar code is output from the printer (the bar code may be printed or displayed).

The image of the output bar code is sensed by the digital camera and data representing the bar code is obtained. Wireless-LAN information is read from the obtained bar code data. When this occurs, image data that has been recorded on a recording medium of the digital camera is transmitted to the printer using the setting information and transmission-destination information contained in the read wireless-LAN information.

Thus, printing can be performed in a direct print system comparatively simply utilizing wireless-LAN information.

The wireless LAN acquisition device has a setting information generating device for generating the setting information; and a transmission-destination information generating device for generating the transmission-destination information.

The wireless-LAN information acquisition device has a setting information memory for storing the setting information; a transmission-destination information requesting device for requesting a server, which generates the transmission-destination information, to transmit the transmission-destination information; and a transmission-destination information receiving device for receiving the transmission-destination information that is transmitted from the server in response to the request by the transmission-destination information requesting device.

The output device of the printer may output at least one of the setting information and transmission-destination information in addition to the bar code.

The printer in this system includes a transmission-destination information storage device for storing transmission-destination information included in the wireless-LAN information that has been acquired by the wireless-LAN information acquisition device of the printer; a determination device for determining whether transmission-destination information included in wireless-LAN information that has been acquired by the wireless-LAN information acquisition device is different from the transmission-destination information that has been stored in the transmission-destination information storage device; a control device for controlling the bar code generating device and the output device so as to output the bar code in response to a determination that the transmission-destination information is different; and an updating device for updating the transmission-destination information, which has been stored in the transmission-destination information storage device, in response to outputting of the bar code by the output device.

According to a second aspect of the present invention, the foregoing object is attained by providing a printer that constructs the above-described direct print system. The printer according to the second aspect of the present invention comprises a wireless-LAN information acquisition device for acquiring wireless-LAN information, which includes setting information and transmission-destination information, used in transmission utilizing a wireless LAN; a bar code generating device for generating a bar code representing the wireless- LAN information that has been acquired by the wireless-LAN information acquisition device; and an output device for outputting the bar code that has been generated by the bar code generating device.

According to the second aspect of the present invention, there is also provided a method of controlling the above-described printer. Specifically, the method comprises the steps of: acquiring wireless-LAN information, which includes setting information and transmission-destination information, used in transmission utilizing a wireless LAN; generating a bar code representing the acquired wireless-LAN information; and outputting the generated bar code.

According to a third aspect of the present invention, the foregoing object is attained by providing a digital camera that constructs the above-described direct print system. The digital camera according to the third aspect of the present invention comprises an image sensing device for sensing the image of a bar code representing wireless-LAN information, which includes setting information and transmission-destination information, used in transmission utilizing a wireless LAN, and outputting data representing the bar code; a wireless-LAN information reading device for reading the wireless-LAN information from the bar code data that has been output from the image sensing device; and a wireless-LAN transmitting device for transmitting image data, which has been recorded on a recording medium, to a printer using the setting information and transmission-destination information included in the wireless-LAN information that has been read by the wireless-LAN information reading device.

According to the third aspect of the present invention, there is also provided a method of controlling the above-described digital camera. Specifically, the method comprises the steps of: sensing the image of a bar code representing wireless-LAN information, which includes setting information and transmission-destination information, used in transmission utilizing a wireless LAN, and obtaining data representing the bar code; reading the wireless-LAN information from the obtained bar code data; and transmitting image data, which has been recorded on a recording medium, to a printer utilizing a wireless LAN and using the setting information and transmission-destination information included in the read wireless-LAN information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 illustrates an example of a direct print system;

DESCRIPTION OF THE PREFERRED EMBODIMENTS

Figure 2A:
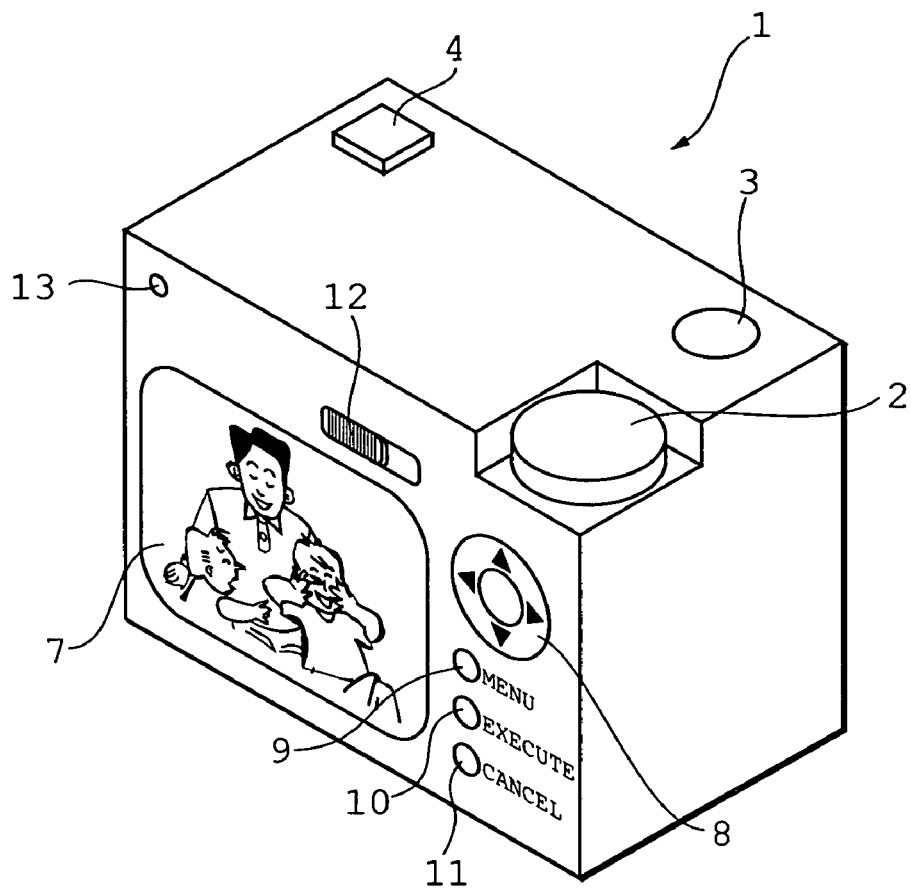
FIG. 2A is a perspective view of a digital still camera.

A preferred embodiment of the present invention will now be described in detail with reference to the drawings.

FIG. 1 illustrates a direct print system that utilizes a home network in an embodiment of the present invention.

Connected to the home network is an access point unit 174 via which a digital still camera 1 and a printer 50 (which construct a direct print system) are capable of communicating with each other (in an infrastructure mode).

Also connected to the home network in addition to the access point unit 174 are a DHCP (Dynamic Host Configuration Protocol) server (server) 170, a home server 171, a wired printer (this printer is referred to as a "wired printer" to distinguish it from the printer 50, which constructs the direct print system) 172, and a personal computer 173.

Provided on the top of the digital still camera 1 on the left side thereof are a mode selection dial 2 and shutter-release button 3. A radio communication antenna 4 is provided on the top of the camera on its right side.

An image sensing lens 6 is provided on the front side of the digital still camera 1 substantially at the center thereof. An electronic flash unit 5 is provided at the upper-left corner of the camera on its front side.

A radio communication antenna 51 is provided on the top side of the printer 50 at the back thereof. A freely removable cover 52 for dealing with problems such as jamming of printing paper is provided on the top of the printer 50 on the right side thereof at the front. A mode selecting slide switch 53 and various switches 54 are provided on the top of the printer 50 on its left side. The various switches 54 include a sheet printing button (a button that is pressed if a direct print setting sheet is to be printed, as will be described later), a button for inputting wireless-LAN information, and a power supply button.

A power supply lamp 58 is provided on the front side of the printer 50 at the upper-left corner. Formed in the front side of the printer below the power supply lamp 58 is a card slot 59. A memory card 60 is removably inserted into the card slot 59. A printing paper ejection port 61 is formed in the front of the printer 50 on the right side thereof. A receiving tray 62 for receiving printing paper ejected from the printing paper ejection port 61 is provided on the front side of the printer 50 at a position from which it projects from the printing paper ejection port 61.

In the direct print system according to this embodiment, the printer 50 prints a direct print setting sheet (see FIG. 6) on which has been recorded a two-dimensional bar code representing LAN (Local Area Network) information necessary for wireless communication. The digital still camera 1 senses the image of the two-dimensional bar code that has been recorded on the direct print setting sheet and analyzes the two-dimensional bar code. The wireless-LAN information is set in the digital still camera 1. By using the wireless-LAN information, the digital still camera 1 and printer 50 can communicate with each other via the access point unit 174.

Figure 2B:
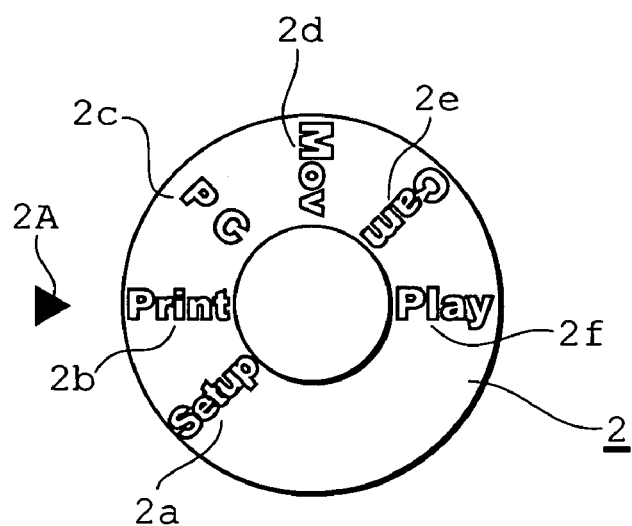
FIG. 2B illustrates an example of a mode selection dial.

FIG. 2A illustrates the back side of the digital still camera 1, and FIG. 2B is an enlarged plan view of the mode selection dial 2.

As shown in FIG. 2A, a display screen 7 is formed on the back side of the digital still camera 1 substantially at the center thereof. Displayed on the display screen 7 are an image formed by the image sensing lens 6, an image represented by image data that has been read out of a memory card inserted into the digital still camera 1, and an image for making various settings relative to the digital still camera 1. A macro-photography changeover button 13 is provided on the back of the digital still camera 1 at the upper left.

A power switch 12 is provided above the display screen 7. Provided on the right side of the display screen 7 are an up, down, left, right key 8, on which arrows capable of being pressed are formed pointing up, down, left and right, for selecting a frame to be displayed on the display screen 7 and for making various settings, a menu button 9, an execute button 10 and a cancel button 11.

As shown in FIG. 2B, the mode selection dial 2 is provided on the digital still camera 1 in rotatable fashion.

An indicator 2A is formed on the left side of the mode selection dial 2. Formed on the mode selection dial 2 in a prescribed spaced-apart relation in the circumferential direction thereof are characters 2a reading "Setup", characters 2b reading "Print", characters reading 2c reading "PC", characters 2d reading "Mov", characters 2e reading "Cam", and characters 2f reading "Play".

If the setup mode is to be set, the Setup characters 2a are positioned at the indicator 2A. If the print mode is to be set, the Print characters 2b are positioned at the indicator 2A. If the PC mode is to be set, the PC characters 2c are positioned at the indicator 2A. If the movie mode is to be set, the Mov characters 2d are positioned at the indicator 2A. If the camera mode is to be set, the Cam characters 2e are positioned at the indicator 2A. If the playback mode is to be set, the Play characters 2f are positioned at the indicator 2A.

The set-up mode is selected by the user if an initial setting, etc., is to be made, the PC mode if data is to be sent and received to and from a personal computer, the movie mode if a moving picture is to be shot, the camera mode if a still picture is to be taken, and the playback mode if a moving picture or still picture is to be played back.

Figure 3:
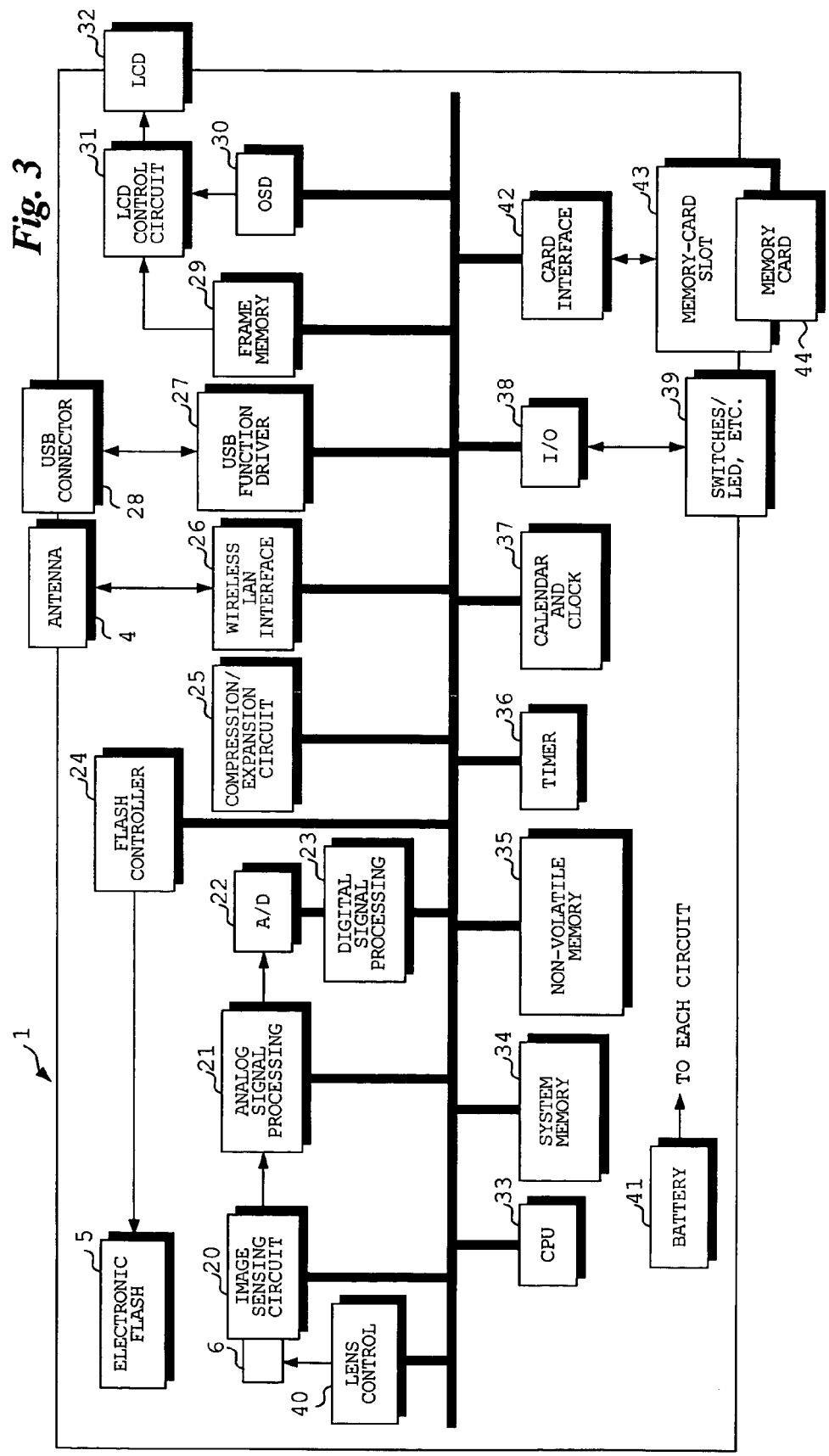
FIG. 3 is a block diagram illustrating the electrical structure of a digital still camera.

FIG. 3 is a block diagram illustrating the electrical structure of the digital still camera 1.

The overall operation of the digital still camera 1 is controlled by a CPU 33. A battery 41 supplies power to the CPU 33 and various other circuits and devices included in the digital still camera 1.

The digital still camera 1 includes a system memory 34 and a non-volatile memory 35. A program and data, etc., for controlling the operation of the digital still camera 1 have been stored in the system memory 34. Further, image data representing the image of a subject obtained by image sensing is also stored in the system memory 34 temporarily.

A timer 36 is used to measure elapsed time when photography is performed using a self-timer. Date and time are measured by a calendar and clock 37.

Output signals from the above-described mode selection dial 2, shutter-release button 3, up, down, left, right key 8, menu button 9, execute button 10 and cancel button 11 (these are indicated at reference numeral 39 in FIG. 3) are input to the CPU 33 via an input/output (I/O) unit 38. If the digital still camera 1 has been provided with a light-emitting diode, a light-emission signal is output to the light-emitting element via the input/output unit 38.

An electronic flash device 5 has its light emission controlled by a flash controller 24.

The digital still camera 1 includes an image sensing unit 20. The image sensing unit 20 is provided with the image sensing lens 6, as mentioned above. The image sensing lens 6 is positioned at the focal point by a lens control circuit 40. The image sensing unit 20 includes a CCD for sensing the image of a subject and outputting an analog video signal representing the image of the subject. If the camera mode is selected by the mode selection dial 2, the image of the subject is sensed by the CCD included in the image sensing unit 20. A video signal representing the image of the subject is applied to an analog signal processing circuit 21. The latter subjects the signal to prescribed analog signal processing such as correlated dual (double) sampling. The analog video signal that has been output from analog signal processing circuit 21 is input to an analog/digital converting circuit 22. The latter converts the analog video signal to digital image data. A digital signal processing circuit 23 subjects this digital image data to prescribed digital signal processing such as a gamma correction and white balance adjustment.

The digital image data that has been output from the digital signal processing circuit 23 is input to an LCD (Liquid Crystal Display) control circuit 31 via a frame memory 29 and is converted in the LCD control circuit 31 to data suited to an LCD display. An image is displayed on the display screen 7.

Also input to the LCD control circuit 31 is an on-screen signal from an OSD (On-Screen Device) 30. Characters standing for date and time represented by the on-screen signal and an image representing a character can be displayed on a liquid crystal display device 32 (display screen 7) in a form superimposed on the captured image.

If the shutter-release button 3 is pressed when the camera mode has been selected by the mode selection dial 2, the image data obtained as described above is stored temporarily in the system memory 34. The image data is read out of the system memory 34 and is compressed by a compression/expansion circuit 25. The compressed image data is recorded on a memory card 44 that has been inserted in an memory-card slot 43 via a card interface 42.

If the playback mode is selected, image data that has been recorded on the memory card 44 is read out and applied to the compression/expansion circuit 25 via the card interface 42. The compression/expansion circuit 25 executes expansion processing and inputs the expanded image data to the LCD control circuit 31 via the frame memory 29. The image represented by the image data that has been recorded on the memory card 44 is displayed on the liquid crystal display device 32 (display screen 7).

The digital still camera 1 is equipped with an antenna 4 for a wireless communication. A wireless LAN interface 26 is connected to the antenna 4. The sending and receiving of image data utilizing a wireless LAN is performed between the digital still camera 1 and the access point unit 174 via the antenna 4 using wireless-LAN information, which will be described later.

The digital still camera 1 is further provided with a USB (Universal Serial Bus) connector 28 and a USB function driver 27 for communication with a personal computer or the like using a USB cable.

If the print mode has been set, the fact that the image of a two-dimensional bar code, which has been recorded on a direct print setting sheet printed by the printer 50, will be sensed is displayed, as will be described later in greater detail. The image of the two-dimensional bar code is sensed in accordance with this display. The two-dimensional bar code contains wireless-LAN information. The wireless-LAN information is sensed from the data obtained by sensing the image of the two-dimensional bar code. The sensed wireless-LAN information is set in the digital still camera 1 so that wireless communication can be performed. Image data representing an image to be printed is read from the memory card 43 and is transmitted from the digital still camera 1 to the printer 50 via the access point unit 174.

Figure 4:
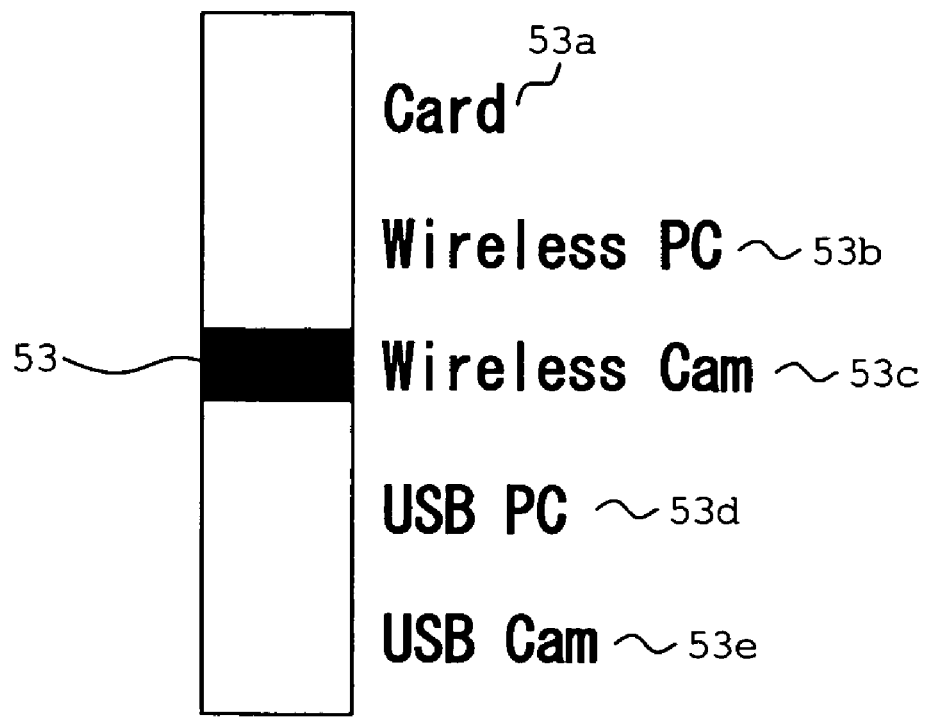
FIG. 4 illustrates a mode selecting slide switch.

FIG. 4 is an enlarged plan view of the mode selecting slide switch 53 of printer 50.

Formed on the right side of the mode selecting slide switch 53 (in back of the switch in FIG. 1) are characters 53a reading "Card", characters 53b reading "Wireless PC", characters reading 53c reading "Wireless Cam", characters 53d reading "USB PC", and characters 53e reading "USB Cam". The mode selecting slide switch 53 is slidable. The switch 53 is positioned at the Card characters 53a if the card mode is to be set, at the Wireless PC characters 53b if the wireless PC communication mode is to be set, at the Wireless Cam characters 53c if the wireless camera communication mode is to be set, at the USB PC characters 53d if the USB PC communication mode is to be set, and at the USB Cam characters 53e if the USB camera communication mode is to be set.

The card mode is selected if an image represented by image data that has been recorded on the memory card 60 inserted into the card slot 59 is to be printed. The wireless PC communication mode is selected if data is sent and received wirelessly to and from a personal computer (not shown) via the antenna 51 and an image representing image data transmitted from the personal computer is to be printed. The wireless camera communication mode is selected if data is sent and received wirelessly to and from the digital still camera 1 via the antenna 51 and an image representing image data transmitted from the digital still camera 1 is to be printed (i.e., in the case of direct print). The USB PC communication mode and USB camera communication mode are selected if data is sent and received to and from a personal computer, etc., using a USB cable and an image represented by image data transmitted from a personal computer, etc., is to be printed.

Figure 5:
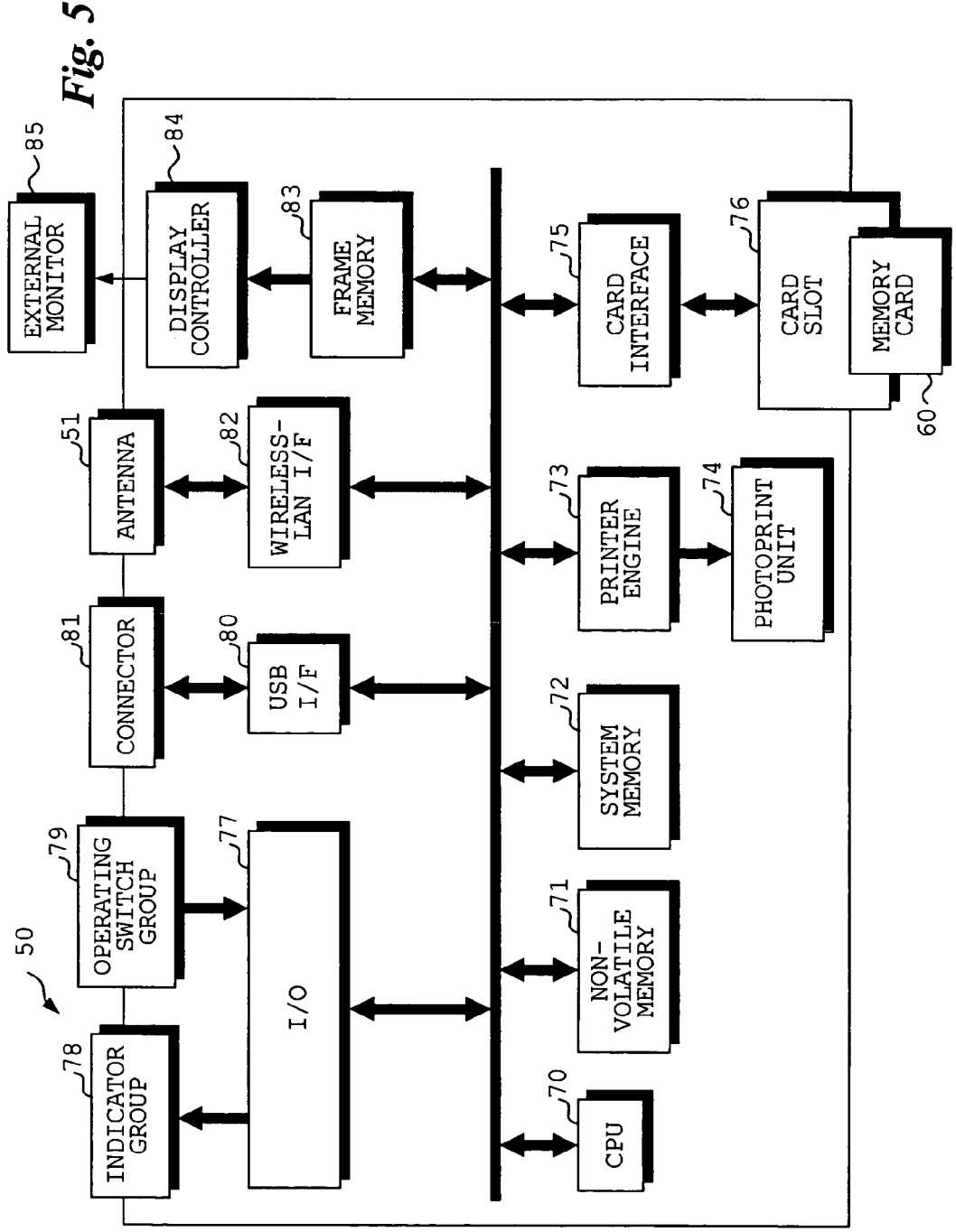
FIG. 5 is a block diagram illustrating the electrical structure of a printer.

FIG. 5 is a block diagram illustrating the electrical structure of the printer 50.

The printer 50 includes a CPU 70 whereby the overall operation of the printer 50 is controlled.

The printer 50 includes a non-volatile memory 71. Wireless-LAN information, image data, printer information such as the printer model name and data are stored in the non-volatile memory 71. A program and data, etc., for controlling the operation of the printer 50 have been stored in a system memory 72.

A printer engine 73, which is for performing a profile setting and other processing, is connected to a photoprint unit 74. When image data that is output from the operating window 73 is applied to the photoprint unit 74, the latter photoprints an image (inclusive of text, etc.) on printing paper. Printing paper on which an image has been photoprinted is ejected to the outside of the printer 50 from the ejection port 62.

Output signals from the mode selecting slide switch 53 and switches 54 (these shall be referred to collectively as an "operating switch group 79") are input to the CPU 70 via an input/output unit 77. Wireless-LAN information is input from the operating switch group 79 and stored in the non-volatile memory 71, as mentioned above. A display signal is applied to an indicator group 78, which includes the power supply lamp 58, via the input/output unit 77.

If the card mode is selected by the mode selecting slide switch 53, an image represented by image data that has been recorded on the memory card 60 inserted into the card slot 59 is printed. Image data that has been read out of the memory card 60 in a card slot 76 is stored temporarily in a frame memory 83 via a card interface 75. Image data that has been read out of the frame memory 83 is input to the printer engine 73. The image data is input to the photoprint unit 74 from the printer engine 73 and the image represented thereby is printed on printing paper by the photoprint unit 74.

Image data that has been stored in the frame memory 83 can be applied to an external monitor 85 connected to the printer 50 via a display controller 84.

As mentioned above, the printer 50 is equipped with the antenna 51 for communicating with the digital still camera 1. A wireless-LAN interface 82 is connected to the antenna 51. Data is sent and received between the printer 50 and the digital still camera 1 via the antenna 51. Further, the printer 50 includes a USB interface 80 and a connector 81 connected to the USB interface 80.

If the wireless camera mode is selected by the mode selecting slide switch 53, image data that has been transmitted from the digital still camera 1 via the access point unit 174 is received by the antenna 51. The received image data is stored temporarily in the non-volatile memory 71 via the wireless-LAN interface 82. Image data is read out of the non-volatile memory 71 and applied to the printer engine 73, whereby image data represented by the received image data is printed.

Figure 6:
FIG. 6 illustrates an example of a direct print setting sheet.

FIG. 6 illustrates an example of a direct print setting sheet printed by the printer 50. It may of course be so arranged that the direct print setting sheet is displayed on the printer 50 rather than being printed. In such case it may be so arranged that the sheet is displayed on a display unit provided on the printer 40 or on the external monitor 85 connected to the printer 50.

Recorded on a direct print setting sheet 90 are the name (Ultra Printer 100) of the printer that can be set by the setting sheet 90, an indication that this is a direct print setting sheet, wireless-LAN setting information and printer setting information.

The wireless-LAN setting information is information necessary to perform wireless communication. This information is an ESS (Extended Service)-ID, a WEP (Wired Equivalent Privacy) KEY (the ESS-ID and WEP KEY are setting information used in transmission utilizing a wireless LAN) and a wireless LAN mode (infrastructure mode). The printer setting information is information necessary to communicate with the printer 50 and is composed of an IP (Internet Protocol) address (transmission-destination information), a user name and a password. The user name and password are utilized to authenticate whether the user has the right to use the printer 50.

Also set forth on the direct print setting sheet 90 are a two-dimensional bar code 91 and instructions to the effect that the two-dimensional bar code 91 is to be photographed if the wireless setting information is to be set in the digital still camera 1.

Figure 7:
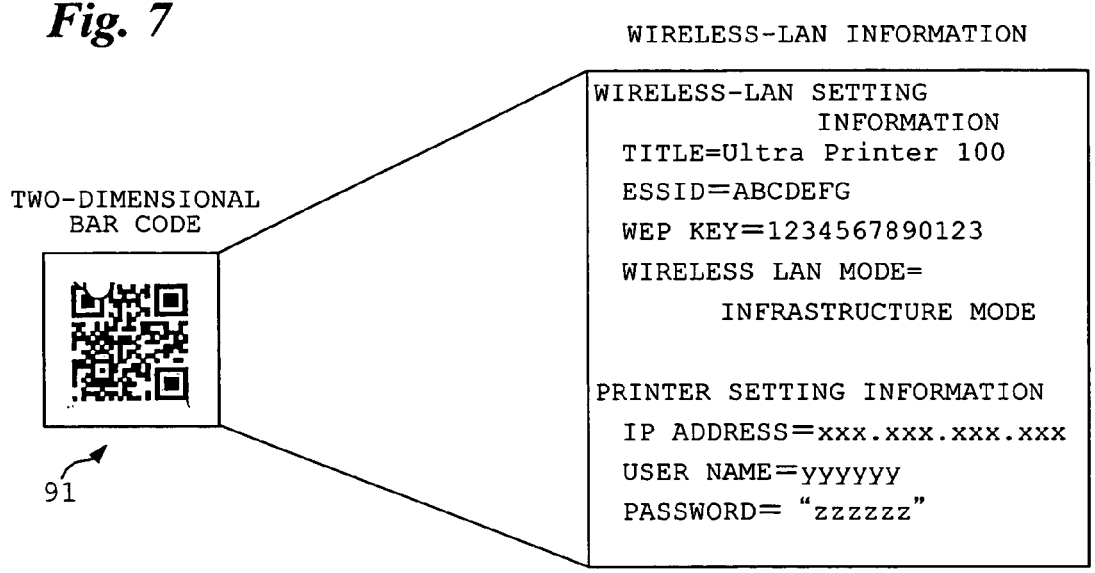
FIG. 7 illustrates a two-dimensional bar code and the content of wireless-LAN information that is contained in the bar code.

FIG. 7 illustrates the content of wireless-LAN information contained in the two-dimensional bar code 91 that has been recorded on the direct print setting sheet 90.

The content that has been recorded on the direct print setting sheet 90 is encoded and contained in the two-dimensional bar code 91. That is, the two-dimensional bar code 91 contains wireless-LAN setting information and printer setting information. The name (Ultra Printer 100) indicated on the direct print setting sheet 90 is contained in the wireless-LAN setting information.

Figure 8:
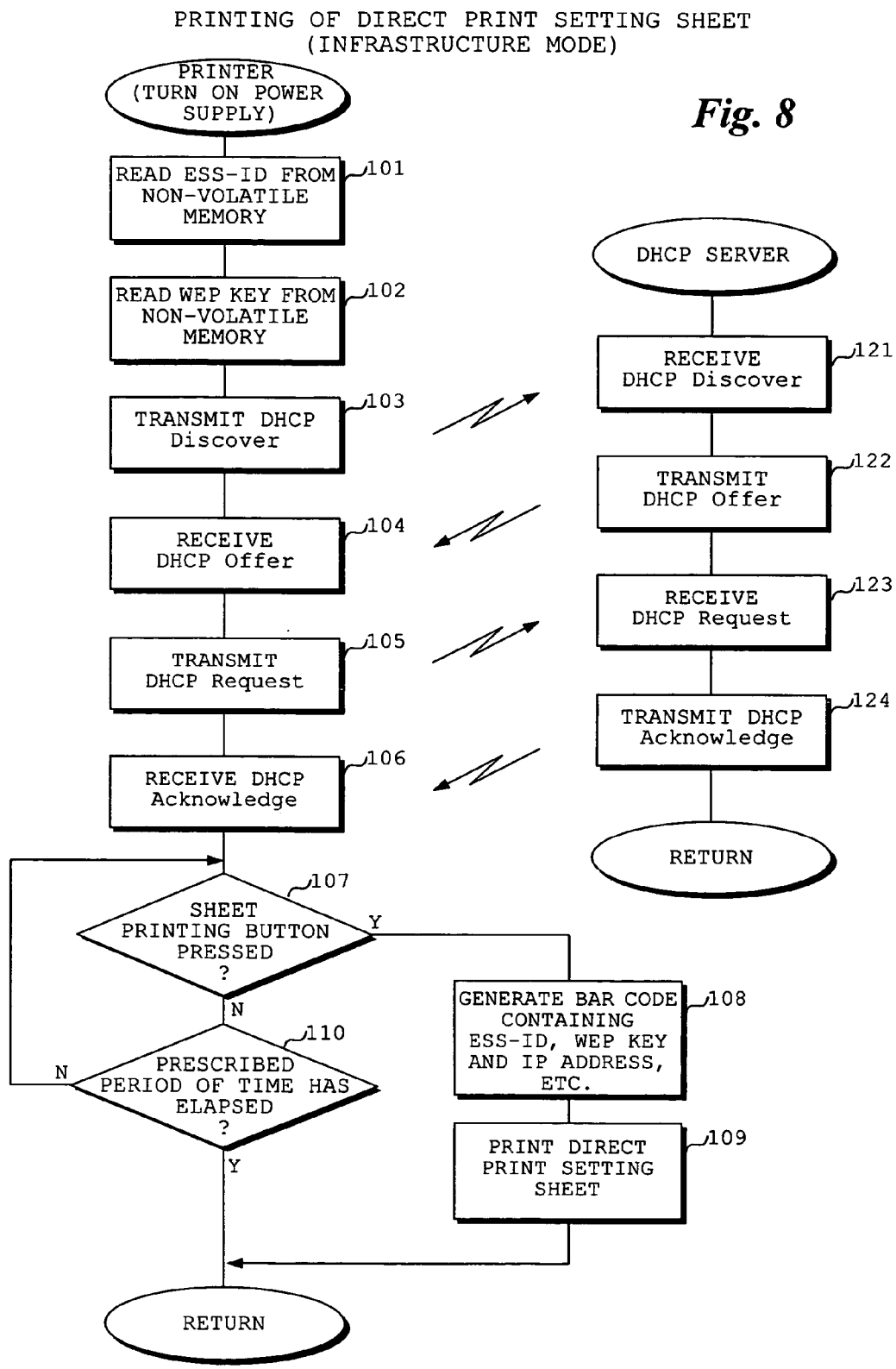
FIG. 8 is a flowchart illustrating processing for printing a direct print setting sheet in an infrastructure mode.

FIG. 8 is a flowchart illustrating processing for printing the direct print setting sheet 90 from the printer 50 in the infrastructure mode. The infrastructure mode has been set in the printer 50 beforehand by the switch group 54.

In the infrastructure mode, ESS-ID and WEP KEY are input using the switch group 54 and are stored in the non-volatile memory 71. The IP address of the printer 50 is assigned in the DHCP server 170 in the infrastructure mode.

If the power supply of the printer 50 is turned on, a timer (not shown) in the printer 50 starts measuring time. Further, the ESS-ID and WEP KEY that have been stored in the non-volatile memory 71 are read (steps 101, 102).

Next, in order to request a network setting that includes acquisition of an IP address, DHCP Discover is transmitted from the printer 50 to the DHCP server 170 (step 103).

When DHCP Discover transmitted from the printer 50 is received at the DHCP server 170 (step 121), DHCP Offer, which indicates the network setting inclusive of the IP address that may be used, is transmitted from the DHCP server 170 to the printer 50 (step 122).

When DHCP Offer transmitted from the DHCP server 170 is received by the digital still camera 1 (step 104), a DHCP Request that includes an indication that the reported network setting has been used is transmitted from the printer 50 to the DHCP server 170 (step 105).

When the DHCP Request transmitted from the printer 50 is received by the DHCP server 170 (step 123), DHCP Acknowledge, which indicates permission for use, is transmitted from the DHCP server 170 to the printer 50 (step 124).

DHCP Acknowledge transmitted from the DHCP server 170 is received by the printer 50 (step 106).

If the sheet printing button included in the switch group 54 is pressed at the printer 50 ("YES" at step 107), the printer generates a two-dimensional bar code containing the wireless-LAN setting information inclusive of ESS-ID and WEP KEY read from the non-volatile memory 71 and printer setting information inclusive of the IP address assigned by the DHCP server 170 (step 108). A direct print setting sheet on which the generated two-dimensional bar code has been recorded is printed by the printer (step 109).

If the sheet printing button is not pressed ("NO" at step 107), it is determined whether a prescribed period of time has elapsed since the power supply was turned on (step 110). If the prescribed period of time has elapsed ("YES" at step 110), an indication of this is presented as by the display indicator group 78 and other processing such as issuing a warning to the user is executed. If the prescribed period of time has not elapsed ("NO" at step 110), then the processing of steps 107 and 110 is repeated until the sheet printing button is pressed or the prescribed period of time elapses.

Thus, the direct print setting sheet 90 is obtained from the printer 50. In the above-described embodiment, the direct print setting sheet 90 is printed in response to the power supply of the printer 50 being turned on. However, it may be so arranged that the direct print setting sheet 90 is printed if the acquired IP address has been stored in the non-volatile memory 71, etc., and a newly acquired IP address differs from the previous IP address already stored. This makes it possible to avoid a situation in which the direct print setting sheet 90 is printed whenever the power supply of the printer 50 is turned on and allows wireless-LAN information to be set in the digital still camera 1 utilizing the direct print setting sheet 90 that has previously been printed.

Figure 9:
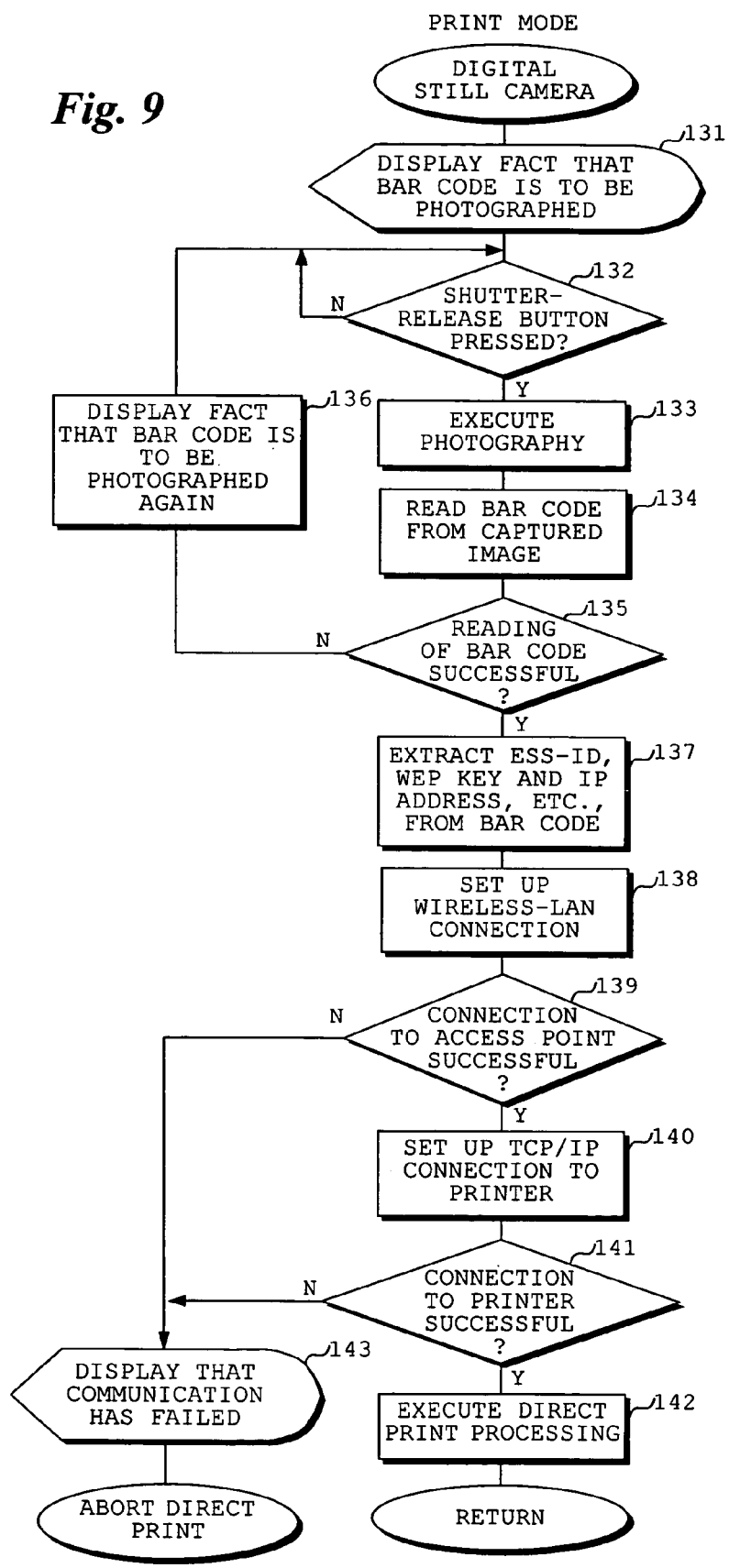
FIG. 9 is a flowchart illustrating processing executed by a digital still camera in a printing mode.

FIG. 9 is a flowchart illustrating processing executed by the digital still camera 1 set to the printing mode.

If the printing mode is selected by the mode selection dial 2, the fact that a picture is to be taken of the two-dimensional bar code 91 recorded on the direct print setting sheet 90 is displayed on the display screen 7 of the digital still camera 1 (step 131).

If the digital still camera 1 is pointed toward the direct print setting sheet 90 so as to include the two-dimensional bar code 91 in its view and the shutter-release button 3 is pressed by the user (step 132), processing to shoot the direct print setting sheet 90 is executed (step 133). Image data representing the direct print setting sheet 90 obtained by such photography is stored in the system memory 34 temporarily. The image representing the two-dimensional bar code 91 is read from the image representing the direct print setting sheet 90 (step 134).

If the reading of the image representing the two-dimensional bar code 91 has not succeeded ("NO" at step 135), then the fact that the two-dimensional bar code is to be photographed again is displayed on the display screen 7 (step 136).

If the reading of the image representing the two-dimensional bar code 91 has succeeded ("YES" at step 135), then the image of the read two-dimensional bar code 91 is analyzed and the wireless-LAN information such as ESS-ID, WEP KEY and IP address is extracted (step 137). When this has been achieved, a wireless-LAN connection is set up (the infrastructure mode also is set) between the digital still camera 1 and the access point unit 174 using the wireless-LAN information that has been extracted (step 138). That is, the required information from the wireless-LAN information is set in the wireless-LAN interface of the digital still camera 1. It goes without saying that if an ad-hoc mode has been set, as will be described later, a wireless-LAN connection is set up between digital still camera 1 and the printer 50.

If the wireless-LAN connection between the digital still camera 1 and the access point unit 174 has succeeded ("YES" at step 139), then a TCP (Transmission Control Protocol)/IP connection is set up between the digital still camera 1 and printer 50 (step 140).

If the TCP/IP connection has succeeded ("YES" at step 141), then direct print processing is started, image data is read from the memory card 44 and the image data is transmitted to the printer 50 via the access point unit 174 (step 142). Upon receiving the image data transmitted from the digital still camera 1, the printer 50 prints the image represented by the received image data.

If the wireless-LAN connection between the digital still camera 1 and the access point unit 174 has not succeeded ("NO" at step 139), or TCP/IP connection between the digital still camera 1 and the printer 50 has failed ("NO" at step 141), then the fact that communication failed is displayed on the display screen 7 (step 143). Direct printing between the digital still camera 1 and printer 50 is aborted. Connection processing is executed again as necessary.

Figure 10:
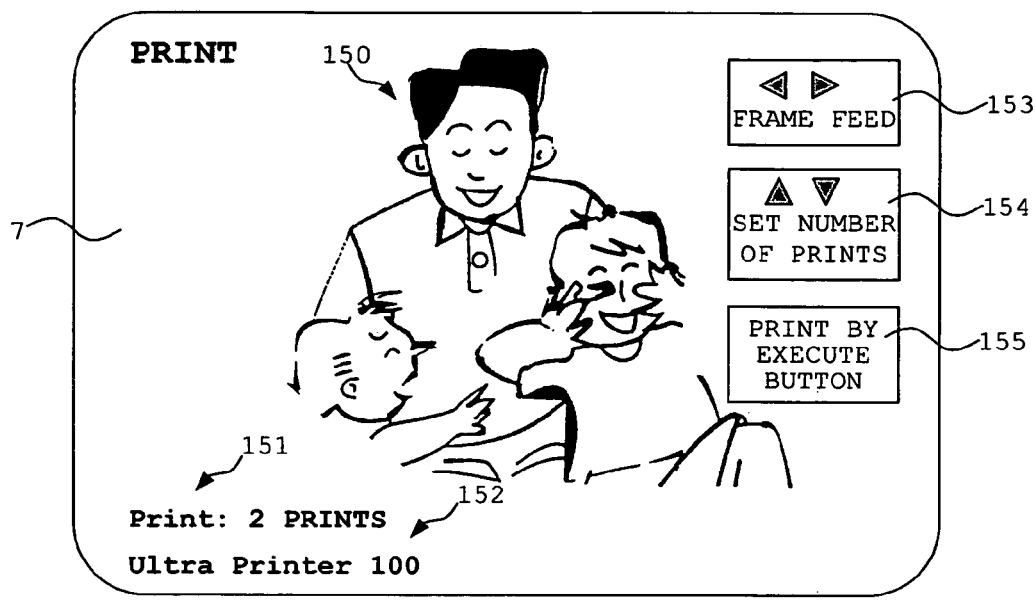
FIG. 10 illustrates an example of an image displayed on a display screen of a digital still camera.

FIG. 10 illustrates an example of an image displayed on the display screen 7 of the digital still camera 1.

As set forth above, image data that has been recorded on the memory card 44 is read if the print mode is set by the mode selection dial 2 and processing has shifted to direct print processing. The image represented by the read image data is displayed on the display screen 7.

Displayed on the right side of the display screen 7 are a frame-feed notification area 153, a print-count notification area 154 and a print-command notification area 155. The fact that frame feed will be performed by pressing the left arrow or right arrow of the up, down, left, right button 8 is being displayed in the frame-feed notification area 153. The image of the frame immediately preceding or immediately following the image being displayed on the display screen 7 is displayed on the display screen 7 by pressing the left arrow or the right arrow, respectively. The fact that the number of prints can be set by pressing the up key or down key of the up, down, left, right button 8 is being displayed in the print-count notification area 154. The number of prints can be increased or decreased by pressing the up arrow or down arrow, respectively. The fact that a print command can be applied by pressing the execute button 10 is being displayed in the print-command notification area 155. Furthermore, an area 151 displaying the number of prints set and an area 152 indicating the name of the printer are formed at the lower left of the display screen 7.

By utilizing the up, down, left, right button 8 to select the image to be printed and to set the number of prints and by pressing the execute button 10, image data representing the selected image is transmitted from the digital still camera 1 to the printer 50 via the access point unit 174. Direct print utilizing the home network is thus carried out.

Figure 11:
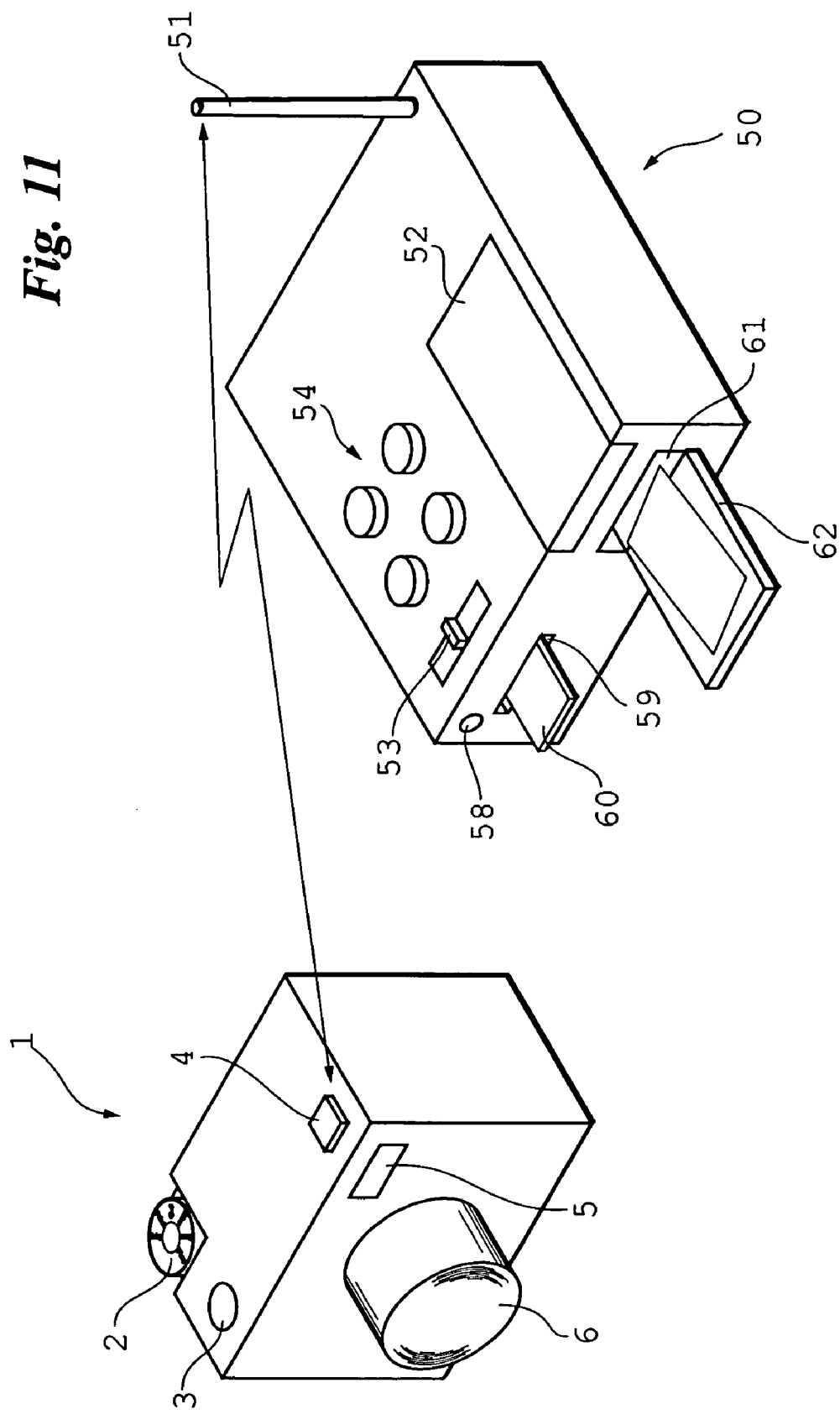
FIG. 11 illustrates another example of a direct print system.
Figure 12:
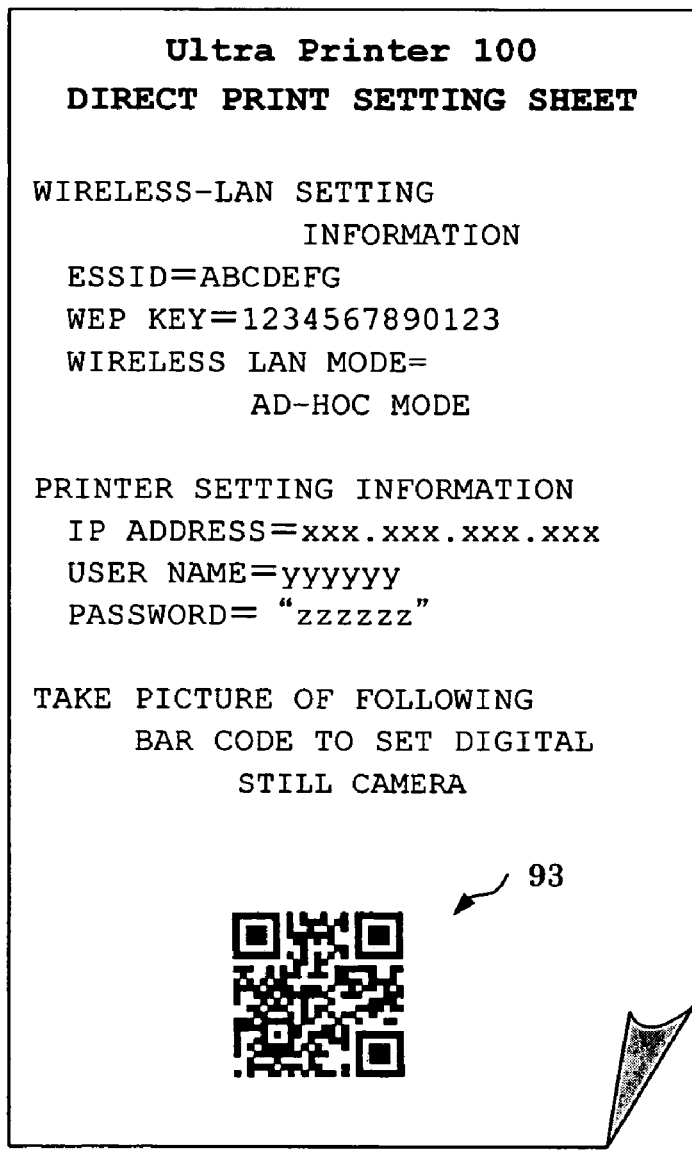
FIG. 12 illustrates another example of a direct print setting sheet.
Figure 13:
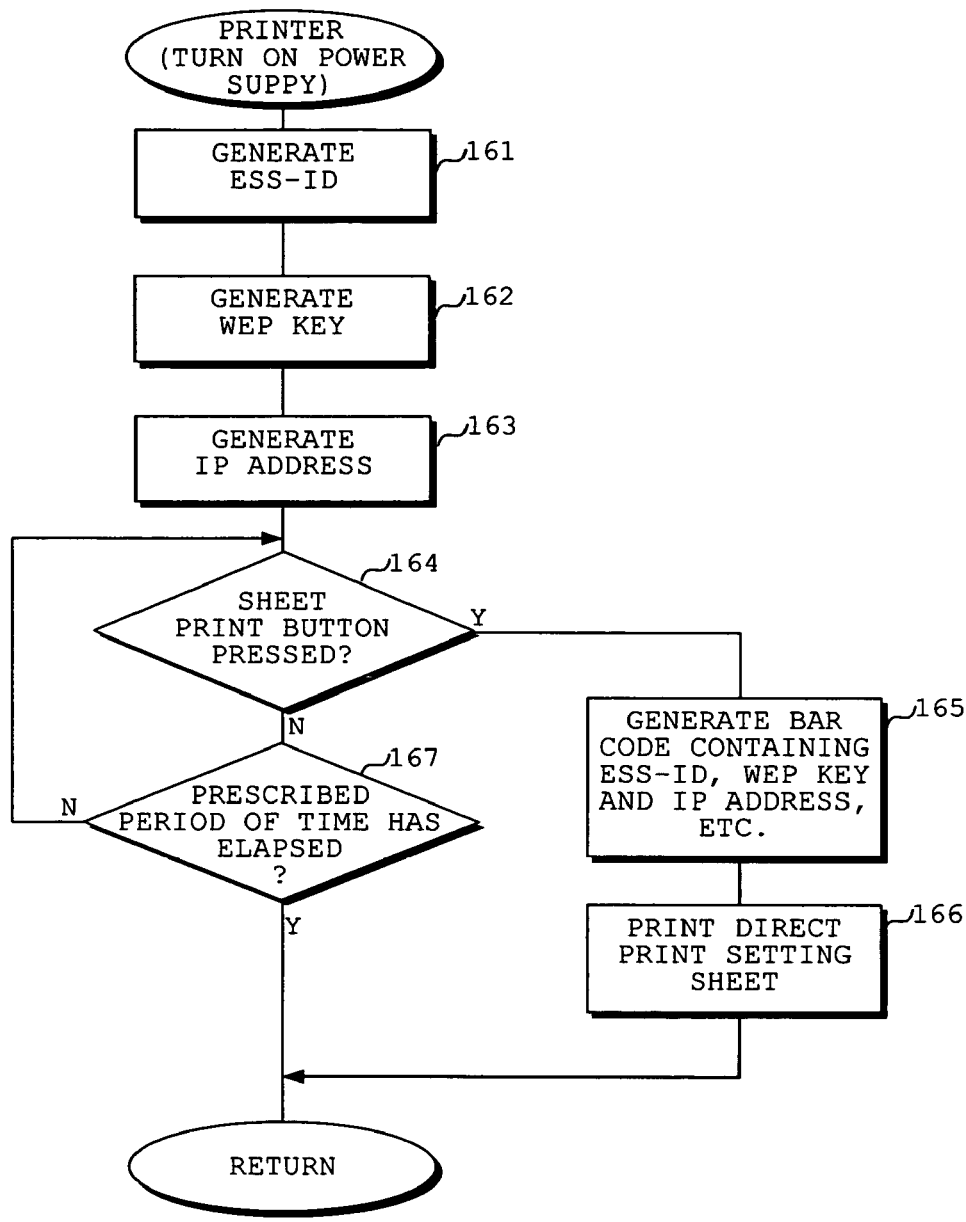
FIG. 13 is a flowchart illustrating processing for printing a direct print setting sheet in an ad-hoc mode.

FIGS. 11 to 13 illustrate another embodiment of the present invention, in which direct print based upon wireless communication in an ad-hoc mode is carried out. Components in FIGS. 11 to 13 that are identical with those shown in FIGS. 1 to 9 are designated by like reference characters and need not be described again.

In wireless communication in the ad-hoc mode, as shown in FIG. 11, the digital still camera 1 and printer 50 do not communicate via the access point unit as in wireless communication in the infrastructure mode. Instead, wireless communication between the digital still camera 1 and printer 50 takes place directly.

FIG. 12 illustrates an example of a direct print setting sheet 92 printed by the printer 50 in the ad-hoc mode.

In a manner similar to that of a direct print setting sheet 92 printed in the infrastructure mode, the direct print setting sheet 92 printed in the ad-hoc mode also has the name of the printer, wireless-LAN setting information (the fact that the wireless-LAN mode has been made the ad-hoc mode is different from the sheet 90), printer setting information and a two-dimensional bar code 93 recorded thereon. The wireless-LAN setting information, printer setting information and printer name are encoded and contained in the two-dimensional bar code 93.

FIG. 13 is a flowchart illustrating processing executed by the printer 50 that prints the direct print setting sheet in the ad-hoc mode.

If the power supply of the printer 50 is turned on, a timer starts measuring time. In the ad-hoc mode, ESS-ID, WEP KEY and the IP address are generated by the CPU 70 (steps 161 to 163).

If the sheet printing button is pressed ("YES" at step 164), a two-dimensional bar code that includes the generated ESS-ID, WEP KEY and IP address is generated (step 165). The direct print setting sheet 92 on which the generated direct print setting sheet 92 has been recorded is printed (step 166).

If a prescribed period of time elapses from turn-on of the power supply ("YES" at step 167) without the sheet printing button being pressed ("NO" at step 164), a warning based upon this passage of time is issued. If the prescribed period of time has not elapsed from turn-on of the power supply ("NO" at step 167), then the processing of steps 164 and 167 is repeated.

By taking a picture of the direct print setting sheet thus obtained, wireless-LAN information can be set in the digital still camera. This is similar to the case where the infrastructure mode is set.

In the embodiments described above, a two-dimensional bar code contains wireless-LAN information that has been encoded. However, it may be so arranged that another bar code such as a one-dimensional bar code is used instead of the two-dimensional bar code.

In addition to the two-dimensional bar code, both wireless-LAN setting information and printer setting information is recorded on the above-described direct print setting sheet. However, either one of these items of information may be recorded on the sheet or neither item of information may be recorded on the sheet (e.g., only the two-dimensional bar code is recorded on the sheet).

As many apparently widely different embodiments of the present invention can be made without departing from the spirit and scope thereof, it is to be understood that the invention is not limited to the specific embodiments thereof except as defined in the appended claims.

What is claimed is:

1. A direct print system that includes a digital camera and a printer that are configured for communicating with each other utilizing a wireless LAN, wherein said printer comprises:

a wireless-LAN information acquisition device for acquiring wireless-LAN information, which includes network encryption setting information and transmission-destination information, used in transmission utilizing a wireless LAN;

a bar code generating device for generating a bar code representing the wireless-LAN information that has been acquired by said wireless-LAN information acquisition device; and an output device for outputting the bar code that has been generated by said bar code generating device;

and said digital camera comprises:

an image sensing device for sensing the image of the bar code that has been output by said output device of said printer and outputting data representing the bar code;

a wireless-LAN information reading device for reading wireless-LAN information from the bar code data that has been output from said image sensing device to configure network encryption settings of the digital camera; and a wireless LAN transmitting device for transmitting image data, which has been recorded on a recording medium, to said printer using the network encryption setting information and transmission-destination information included in the wireless-LAN information read by said wireless-LAN information reading device.

2. The system according to claim 1, wherein said wireless-LAN information acquisition device includes:

a network encryption setting information generating device for generating the network encryption setting information; and a transmission-destination information generating device for generating the transmission-destination information.

3. The system according to claim 1, wherein said wireless-LAN information acquisition device includes:

a network encryption setting information memory for storing the network encryption setting information;

a transmission-destination information requesting device for requesting a server, which generates the transmission-destination information, to transmit the transmission-destination information; and a transmission-destination information receiving device for receiving the transmission-destination information that is transmitted from the server in response to the request by said transmission-destination information requesting device.

4. The system according to claim 1, wherein said output device of said printer outputs at least one of the network encryption setting information and transmission-destination information in addition to the bar code.

5. The system according to claim 1, wherein the network encryption setting information includes ESSID and WEP key.

6. The system according to claim 1, wherein the output device includes a print output device.

7. The system according to claim 1, wherein the transmission-destination information includes printer network address and user authentication information.

* * * * *